(12) United States Patent
Harris

(10) Patent No.: US 10,860,565 B2
(45) Date of Patent: Dec. 8, 2020

(54) DATABASE UPDATE AND ANALYTICS SYSTEM

(71) Applicant: Aistemos Limited, London (GB)

(72) Inventor: Stephen Harris, London (GB)

(73) Assignee: AISTEMOS LIMITED, London (GB)

( * ) Notice: Subject to any disclaimer, the term of this patent is extended or adjusted under 35 U.S.C. 154(b) by 732 days.

(21) Appl. No.: 15/121,503

(22) PCT Filed: Feb. 27, 2015

(86) PCT No.: PCT/EP2015/054159
§ 371 (c)(1),
(2) Date: Aug. 25, 2016

(87) PCT Pub. No.: WO2015/128472
PCT Pub. Date: Sep. 3, 2015

(65) Prior Publication Data
US 2016/0364428 A1    Dec. 15, 2016

(30) Foreign Application Priority Data

Feb. 27, 2014    (GB) .................................. 1403505.9

(51) Int. Cl.
*G06F 17/00* (2019.01)
*G06F 16/23* (2019.01)
(Continued)

(52) U.S. Cl.
CPC ........ *G06F 16/23* (2019.01); *G06F 16/24578* (2019.01); *G06F 16/285* (2019.01);
(Continued)

(58) Field of Classification Search
CPC .... G06F 16/23; G06F 16/285; G06F 16/9566; G06F 16/9535; G06F 16/951; G06F 16/93; G06F 16/24578; G06Q 50/184
See application file for complete search history.

(56) References Cited

U.S. PATENT DOCUMENTS 7,966,291 B1    6/2011    Petrovic et al.
2002/0147738 A1    10/2002    Reader
(Continued)

OTHER PUBLICATIONS

Uchida et al., Patent Map Generation using Concept-based Vector Space Model. <https://research.nii.ac.jp/ntcir/ntcir-ws4/NTCIR4-WN/PATENT/NTCIR4WN-PATENT-UchidaH.pdf> (Year: 2004).*
(Continued)

*Primary Examiner* — Syed H Hasan
(74) *Attorney, Agent, or Firm* — Fredrikson & Byron, P.A.

(57) ABSTRACT

A computer system is provided comprising one or more processors, one or more memories and one or more programs stored in one or more of the memories for execution by one or more of the processors, the system updating a database that links organizations with intellectual property rights to create associations between related organizations, and being programmed to carry out the process of: performing a search, using an internet search engine, for a first entry from the database containing data indicative of the name of an organization associated with one or more rights to produce a first set of web page results for the first entry; performing a search, using an internet search engine, for a second entry from the database containing data indicative of the name of an organization associated with one or more rights to produce a second set of web page results for the second entry; comparing the first set of results and the second set of results to identify matches between the first set of results and the second set of results and determining whether there is at least one match between the first set of results and the second set of results. If there is at least one match between the first set of results and the second set of results, input data is requested confirming whether the first and second entries relate to a common organisation. If the received input data confirms that the first and second entries (Continued)

US 10,860,565 B2

Page 2 relate to a common organisation, an association between the organization indicated by the first entry and the organization indicated by the second entry is stored in a memory. A corresponding computer implemented method and computer program are also provided.

7 Claims, 10 Drawing Sheets

(51) Int. Cl.
  *G06F 16/28* (2019.01)
  *G06F 16/9535* (2019.01)
  *G06F 16/955* (2019.01)
  *G06F 16/2457* (2019.01)
  *G06F 16/951* (2019.01)
  *G06F 16/93* (2019.01)
  *G06Q 50/18* (2012.01)
(52) U.S. Cl.
  CPC ............ *G06F 16/93* (2019.01); *G06F 16/951* (2019.01); *G06F 16/9535* (2019.01); *G06F 16/9566* (2019.01); *G06Q 50/184* (2013.01)

(56) References Cited

U.S. PATENT DOCUMENTS

| | | | |
|---|---|---|---|
| 2007/0198577 A1 | 8/2007 | Betz et al. | |
| 2008/0033736 A1* | 2/2008 | Bulman | G06Q 50/184 705/310 |
| 2009/0043797 A1* | 2/2009 | Dorie | G06F 16/355 |
| 2012/0278244 A1* | 11/2012 | Lee | G06Q 50/184 705/310 |
| 2013/0185276 A1* | 7/2013 | Rau | G06Q 50/184 707/707 |
| 2013/0246322 A1* | 9/2013 | De Sousa Webber | G06N 3/0454 706/18 |
| 2014/0108273 A1* | 4/2014 | Lundberg | G06Q 40/06 705/310 |

OTHER PUBLICATIONS

Segev et al., Identification of trends from patents using self-organizing maps. <file:///C:/Users/shasan1/Documents/e-Red%20Folder/15121503/2012_eswa_identificationTrendsFronnPatents-SelfOrganizingMaps.pdf> (Year: 2012).*
International Patent Application No. PCT/EP2015/054159, International Search Report and Written Opinion dated Sep. 18, 2015, 19 pages.

* cited by examiner

DATABASE UPDATE AND ANALYTICS SYSTEM

RELATED APPLICATIONS

This application is a 35 U.S.C. 371 national stage filing from International Application No. PCT/EP2015/054159, filed Feb. 27, 2015, which claims priority to British Application No. 1403505.9, filed Feb. 27, 2014, the teachings of which are incorporated herein by reference.

BACKGROUND OF THE INVENTION

This invention relates to methods and systems for updating a database in order to improve the accuracy of information relating to organizations referenced in the database, as well as methods and systems for clustering a set of intellectual property rights stored on a database into different categories for presentation to a user, and methods and systems for comparing a given cluster of intellectual property rights with similar clusters for presentation to a user.

There are a number of publicly and commercially available databases of intellectual property rights. These databases associate a given entity or organization with the intellectual property rights that they own, along with additional information specific to the company and/or to the intellectual property rights. For example, an intellectual property database might associate a company or individual with the one or more patents or patent applications that they own. The additional information might list the organization's address, the intellectual property inventor/creator details, and details of the intellectual property including bibliographic information such as the title, application number and so on.

Databases of this nature, storing data relating to intellectual property, often suffer from a particular issue caused by the fact that data is imported from multiple different sources, and the data has typically been entered by different entities. This can result in various different names being identified as distinct organizations in the database even though the names are actually referring to the same entity.

An equivalent problem can also be experienced when an organization is a subsidiary of, or is related to, another company. This can cause intellectual property databases, when queried, to output only a portion of the relevant results. A search for rights belonging to company A would only identify rights associated with that name, even though company A might be a subsidiary of company B, who also own a number of relevant rights.

Systems that make use of existing intellectual property databases output data that can require a large amount of human intervention to produce a set of results truly indicative of the intellectual property rights owned by a given organization.

Intellectual property right databases may provide a great deal of information for a user, but analysis of the results can be difficult. One cause for this is that whilst classifications can be provided that give an indication of the category of the right, for example the technical field to which a patent relates, these classifications are applied by various different individuals and are rarely consistent.

In addition, it is traditionally very difficult to reliably establish certain properties of a portfolio of intellectual property rights, or the company that owns them, by analysing the raw data contained within a database of intellectual property rights.

Intellectual property may include any type of intellectual property right, including patents (both innovation and design), trade marks, registered and unregistered designs, copyrights, semiconductor topographies, database rights and so on. Use of the term "patent" should be construed to include also the term "patent application" and vice versa. An organization, or entity, for the purposes of the discussion herein, may be a company or collection of people, or may refer to an individual.

SUMMARY OF THE INVENTION

The invention is defined in the independent claims, to which reference is hereby directed. Preferred features are set out in the dependent claims.

We have appreciated that intellectual property databases, and systems for interfacing with them, require improvements such that intellectual property rights associated with a given organization can be identified reliably, even when certain rights are linked in the database to related organizations or different text is used on different entries to represent a single organization.

According to a first aspect a computer system is provided comprising one or more processors, one or more memories and one or more programs stored in one or more of the memories for execution by one or more of the processors, the system updating a database that links organizations with intellectual property rights to create associations between related organizations, and being programmed to carry out the following process:

performing a search, using an internet search engine, for a first entry from the database containing data indicative of the name of an organization associated with one or more rights to produce a first set of web page results for the first entry;

performing a search, using an internet search engine, for a second entry from the database containing data indicative of the name of an organization associated with one or more rights to produce a second set of web page results for the second entry;

comparing the first set of results and the second set of results to identify matches between the first set of results and the second set of results and determining whether there is at least one match between the first set of results and the second set of results;

if there is at least one match between the first set of results and the second set of results, requesting input data confirming whether the first and second entries relate to a common organisation; and if the received input data confirms that the first and second entries relate to a common organisation, storing, in a memory, an association between the organization indicated by the first entry and the organization indicated by the second entry.

A corresponding computer implemented method and computer program are also provided.

We have also appreciated that intellectual property databases, and systems for interfacing with them, require improvements such that intellectual property rights can be appropriately clustered or grouped into appropriate categories, such as appropriate technical areas for patent rights. We have further appreciated that naming or labelling such clusters is an important task that requires improvement.

According to a second aspect, a computer system is provided comprising one or more processors, one or more memories and one or more programs stored in one or more of the memories for execution by one or more of the processors, the system dividing a set of intellectual property rights stored on a database into clusters of different categories for presentation to a user, and being programmed to carry out the following process:

receiving data identifying a set of intellectual property rights;

determining, for each intellectual property right within the set, a plurality of pairwise similarity values by performing a pairwise comparison with substantially each other member of the set;

identifying clusters of closely related intellectual property rights based upon the similarity values;

labelling the clusters based upon a determination of repeating combinations of words between intellectual property rights in a given cluster; and outputting data representative of the clusters and their labels for presentation to a user.

A corresponding computer implemented method and computer program are also provided.

Also provided according to the second aspect is a computerized method of labelling a cluster of intellectual property rights within a set of intellectual property rights stored on a database, the method comprising:

identifying repeating phrases between the text of intellectual property rights in the cluster;

applying a text recognition algorithm to categorise the terms of each phrase into respective grammatical categories;

determining whether each of the repeating phrases adheres to a predetermined pattern of terms having specified grammatical categories; and filtering the identified repeated phrases based on the determination.

A corresponding computer system programmed to implement the method, and a corresponding computer program, are also provided.

We have further appreciated that intellectual property databases, and systems for interfacing with them, require improvements to allow the comparison of a given portfolio or set of intellectual property rights with one or more similar collections in order to allow meaningful comparisons to be made by a user.

According to a third aspect a computer system is provided comprising one or more processors, one or more memories and one or more programs stored in one or more of the memories for execution by one or more of the processors, the system comparing a given set of intellectual property rights with one or more similar collections and outputting data indicative of the comparison for presentation to a user, and being programmed to carry out the following process:

receiving data identifying a first set of intellectual property rights;

determining one or more similar sets of intellectual property rights;

deriving first and second parameters for each of the sets of intellectual property rights; and outputting data for display indicative of the parameters for each of the sets of intellectual property rights;

wherein the step of determining one or more similar sets of intellectual property rights comprises:

receiving from a database, for a plurality of intellectual property rights within the first set, citation data indicative of citations related to each of the plurality of intellectual property rights;

for each of the plurality of intellectual property rights, requesting from a database, for a subset of the citations, data identifying an organization associated with each of the citations within the subset;

assigning a ranking value to each organization based upon the number of citations within the subset associated with each organization; and selecting one or more sets of intellectual property rights based on the rankings of the organizations.

A corresponding computer implemented method and computer program are also provided.

BRIEF DESCRIPTION OF THE DRAWINGS

Preferred embodiments of the invention will now be described in more detail by way of example with reference to the drawings, in which.

DETAILED DESCRIPTION OF THE PREFERRED EMBODIMENTS

Figure 1:
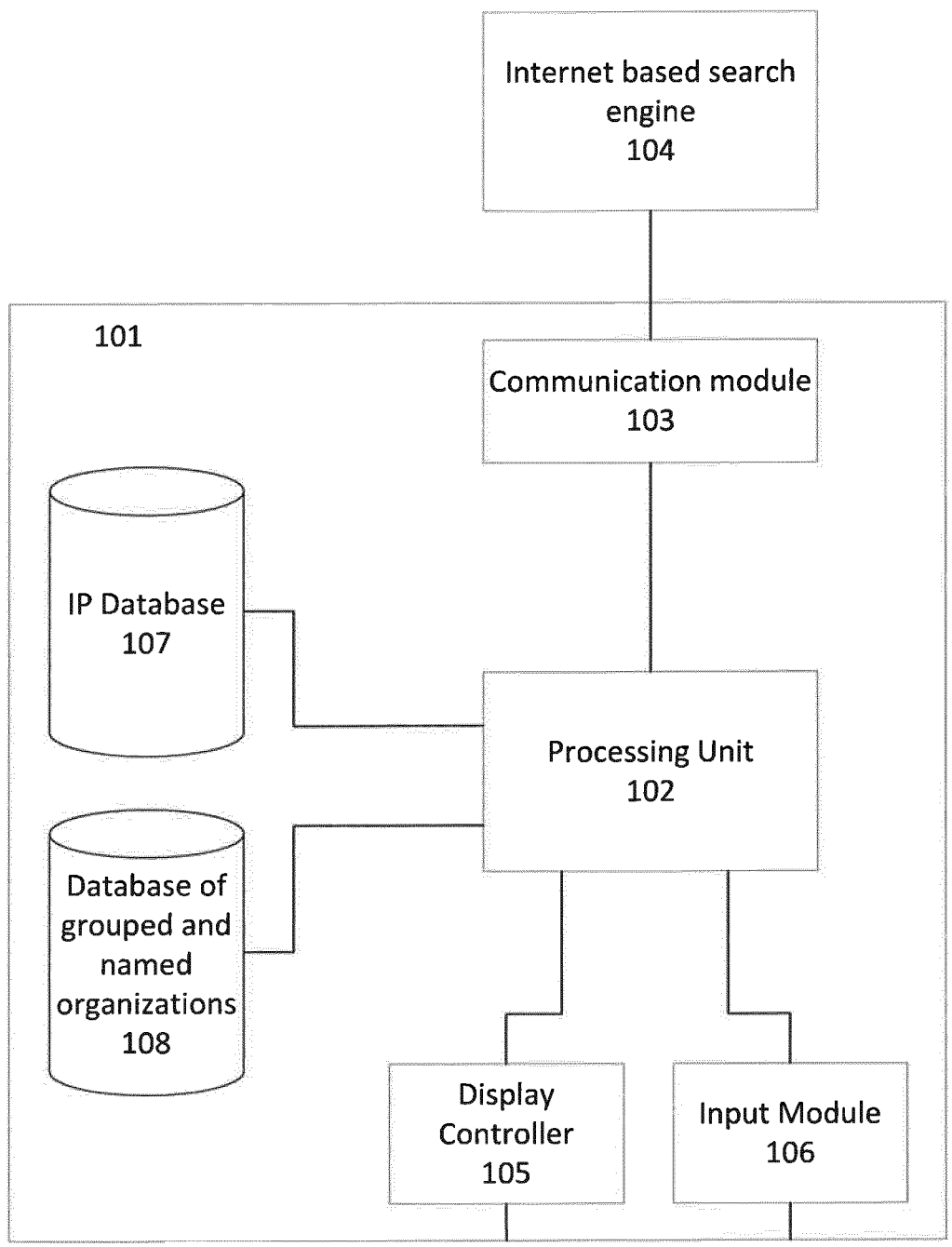
FIG. 1: is a functional diagram of the key components of a system according to a first aspect of the invention.

A first aspect disclosed herein is a computer system operating processes to create associations between related organizations so that a database of intellectual property rights can be updated or corrected. The identification of candidate organizations that are potentially associated with one another is fully automated in the sense that the selection of organizations that might be related to another organization does not require human intervention. The system is arranged to perform a search, using an internet search engine, for a first and a second entry from the database, each entry containing data indicative of the name of a candidate organization associated with one or more rights, to produce first and second sets of search results for the entries. A comparison is then performed of the first set of results and the second set of results to identify matching web pages between the sets of results and a determination is made as to whether there is at least one match between the first set of results and the second set of results. If there is at least one match between the first set of results and the second set of results, the system is configured to request user input data confirming whether the first and second entries relate to a common organization. If the received input data confirms that the first and second entries relate to a common organization the system is configured to store, in a memory, an association between the candidate organization indicated by the first entry and the candidate organization indicated by the second entry. The process is repeated for different combinations of entries within the database to build up a set of associations between entries having different data indicative of the name of the relevant organization.

Input data may be requested from a user, asking for confirmation that the first and second entries relate to a common organization. This can be performed repeatedly for different candidate organization combinations to build up the set of associations. Input data may be requested by presenting, on a display, the data indicative of the names of the candidate organizations along with additional information, obtained from the database of intellectual property rights, related to each of the candidate organizations.

The method may provide a mechanism for altering the web pages, or related web sites or domain names, from the internet search engine that can be used to identify candidate organizations. As the process is repeated for different combinations of entries within the database the system may be configured to store "blacklist" data for each of the web pages found to be a match between sets of results. The blacklist data is indicative of whether the received input data confirms that the entries relate to a common organization or not. This blacklist data is tracked, the system being configured to determine, for a given web page, when the number of times the received input data confirms that the entries do not relate to a common organization exceeds a threshold. Once the threshold is exceeded, the web page in question is removed or blocked from future consideration. Removing the web page from future consideration may comprise adding the web page to a list of web pages to be excluded from future web page results.

The aspect shown in FIG. 1 comprises a computer system 101 that comprises processors, memory and executable code which when executed may lead to the update of a database. Representative of the processing hardware is a processing unit 102, which may comprise, or be coupled to, one or more of the abovementioned components in order to carry out the instructions of the executable code.

The computer system 101 further comprises a communication module 103 for communicating over a network such as the internet. In particular, the communication module 103 is provided to allow the computer system 101 to access the internet and to interface with an internet based search engine 104. The processing unit 102 is configured to instruct internet searches via the communication module 103. The communication module may provide a direct connection to the internet, or it may provide a connection via a local network. The communication module may provide a wired or wireless connection.

The computer system further comprises a display controller 105 for providing an output to a display device, such as a monitor or screen, and an input module 106 for receiving input from a user input device, such as a keyboard, mouse or other computer interface device.

The computer system further comprises an intellectual property (IP) database 107. The IP database 107 associates a given entity or organization with the intellectual property rights that they own, along with additional information specific to the company and/or to the intellectual property rights. The intellectual property database may be a patent database that associates an entity with the one or more patents that they own. The database may also list the entity's address, the patent inventor details, and details of the intellectual property including bibliographic information such as the title, application number, filing date, taxonomic class, citations and so on.

The computer system further comprises a database 108 that stores grouped and named entities or organizations, the entries to which are formed in the manner described herein.

The computer system may be provided as a self contained computer, or it may alternatively be provided as a server system. Such a system may not require the display controller 105 and input module 106, since user interaction with the system may be over a local network or a wide area network such as the internet. Similarly, the IP database 107 and the database of grouped and named organizations 108 may be contained within a store, such as a hard drive, within the computer system, or may be contained within a store that is accessible by the computer system, for example over a network or internet connection. The databases 107 and 108 may be implemented as separate databases, or could be combined into a common database.

The processing unit 102 requests first and second entries from the IP database 107 representative of the name of respective organizations contained within the IP database. This may be a text version of the name of the organization, and may be referred to in a patent database as "assignee codes" or equivalent. The processor then instructs, via the communication module 103, an internet search engine to perform a search for each of the entries, the results of which are returned to the processing unit for further processing. The internet search engine may be any suitable search engine known in the art, such as Google™ or Bing™. The searching may inherently include any error correction provided by the search engine.

The processing unit 102 may take a predetermined number of search results for each entry, such as the first ten or the first twenty results, and then performs a comparison between the two sets of results to identify common web pages having the same URLs. If there is at least a predetermined number of matches, such as one or more matches, then the two organizations are flagged as candidates for being potentially linked. Information can then be requested by sending an output via display controller 105.

An external entity, such as an external system, module or operator, will be presented with data relating to both organizations, obtained from the IP database 107, and given an option of indicating that the organizations are related, unrelated or whether it cannot be determined from the information presented. The operator can provide input that is received at the processing unit 102 via the input module 106 indicative of one of the responses. If the input indicates that the organizations are related then the processing unit 102 instructs the updating of the database 108 to create a link between the two organizations. This process can be repeated for different entries in the database 107 to build up a database of linked organizations.

Figure 2:
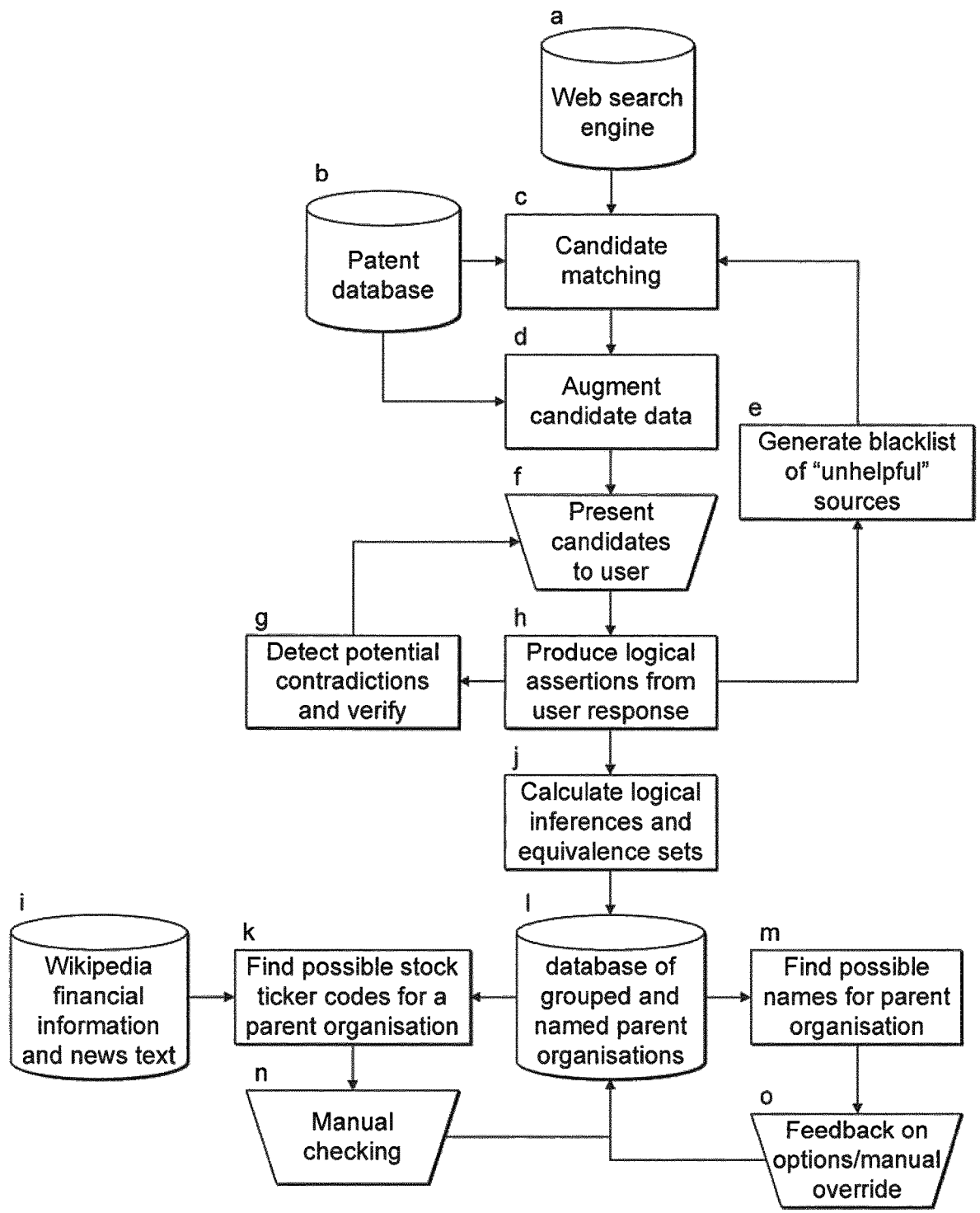
FIG. 2: is a flow diagram showing the main operational steps of a system according to the first aspect of the invention.

FIG. 2 shows an example of the process carried out in order to update a database of patent rights using the computer system of FIG. 1. The first stage in the process is the candidate matching process C, which uses input from the patent database B and web based search engine A, these components being shown for reference purposes. The search engine is fed assignee names, or assignee codes, from the patent database 107 and returns lists of URLs that map to the assignee names. The patent database 107 may include patent titles, taxonomic codes or classes (e.g. IPC codes), citation details, textual abstracts, descriptions, keywords and other bibliographic information.

Figure 3:
FIG. 3: shows an example of a comparison between results.

The candidate matching process identifies a shortlist of matching candidate patent assignee names or codes that may be related to one another based upon one or more of common domain names, URLs and lexical terms. An example of the outcome of the candidate matching process is shown in FIG. 3. FIG. 3 indicates the top ten internet search results for the name identifier/assignee code "GlaxoSmithKline", and the top ten web based search results for the name identifier/assignee code "Glaxo Wellcome Inc", both of which may be stored in the database 107 as separate entries, indicating that they are separate entities even though they may in fact be related. The arrows emanating from each name indicate a search result, or hit, for a webpage relevant to that name. As can be seen from the diagram, three URLs (identified in bold with arrows on each side) are shared between "GlaxoSmithKline" and "Glaxo Wellcome Inc.", making these two organizations a possible match for the candidate shortlist.

Rather than, or as well as, matching entire URLs a similar process may also be performed considering only a portion of the URL, such as one or more of the domain portions of the URL or one or more lexical portions, in order to determine a match. This may include comparing second or third level domain names. For example, rather than matching the entirety of the URL http://aistemos.com/product.html a match could be determined based upon the "aistemos.com" domain portion, or the "public suffix level" plus one, e.g. example.com, example.co.uk, example.de, etc. Similarly, the lexical components of the URL may be considered, such as "aistemos" from the above example.

Other comparisons may be formed which do not require an internet based search. For example, lexical elements, or portions, of assignee codes can be compared between entries to determine if two organizations are candidates for being linked. This will identify assignee codes that share lexical components, e.g. "Glaxo Labs" and "Glaxo Wellcome".

Once pairs of potentially related or linked organizations have been determined based upon the search results the process moves on to step D, where the data relating to the potentially linked candidates is augmented with additional information derived from the patent database 107. This information is provided to allow an operator to reach a decision as to whether the two organizations are linked or not. The additional information may be derived from bibliographic information associated with patents of both organizations, and may include one or more of the degree of overlap in inventor names specified for the patents of the respective organizations, the taxonomic classes (e.g. IPC codes) of the patents belonging to the organizations, the addresses of the organizations, lexical matches for the organizations names, keywords used in the patents, and representative information such as details of the patent agents specified on the patents.

At step F an operator is shown, on a display, a pair of assignee strings/codes (A and B), with supporting information (from step D), and asked to indicate whether they form part of the same overall organization. The operator may provide input, for example via input module 106, indicating their choice as to whether the organizations indicated by the assignee strings are related or not.

Web page URLs and domains that indicate that two organizations may be candidates for being related, but that consistently are answered with a negative indication of relation by the operator, may be blacklisted in stage E such they will no longer be considered when producing candidate shortlists.

At step H, logical assertions may be made which can be used to subsequently extract or check other links or relationships between organizations based upon previously indicated links. For example, if at step F an indication was given that companies A and B are linked, a logical assertion True(A,B) is generated. If an indication was given that the companies are not linked then a logical assertion False(A,B) is generated. At stage G, contradiction detection may be performed to check links or relationships between organizations. The closure of all True logical assertions is considered—i.e. True(X,Y) AND True(Y,Z) ⇒ True(X,Z), True(X,Y) ⇒ True(Y,X). Any logical contradictions—such as False (X,Y) AND True(X,Y) may be flagged for later consideration, and grouping is prevented of entities X and Y. At step J logical inferences may be made using the same closure as in step G, allowing the equivalence sets for all assignee strings to be generated. For example, the logical inferences may indicate that "Glaxo Australia PTY LTD", "Glaxo Canada Inc." and "Glaxo Group Ltd." are all related organizations. The final database of grouped assignee strings is shown at L. As indicated above, this database may be included in the same database as patent database 107, or it may be provided in its own database that can be referenced separately.

The database may optionally include additional information such as stock ticker codes, which may be obtained based on financial information from various sources such as internet based sources shown as I. Using information from source I possible matches for stock codes of the assignee group are identified. Manual checking of stock ticker codes and other financial information can be performed by an operator who is presented with the information to consider the list of possible stock codes and other financial information from step K and may then select the correct one to cause association in the database L. The stock ticker codes and other financial information aid identification, for example if a user subsequently wishes to identify an organization by its stock code.

At steps M and O it is also optionally possible to assign an overall name to the grouped assignee strings. This can be achieved by analysing one or more of information from the internet searches, frequency of assignee substrings, and number of patents assigned to each assignee string to generate a shortlist of possible names for the group. A name may be automatically selected based on the considered factors, but manual checking of possible names can also be performed, in addition or alternatively, by an operator who may then select the correct name to be associated in the database L from the list of names from step M, or may propose an alternative.

Figure 4:
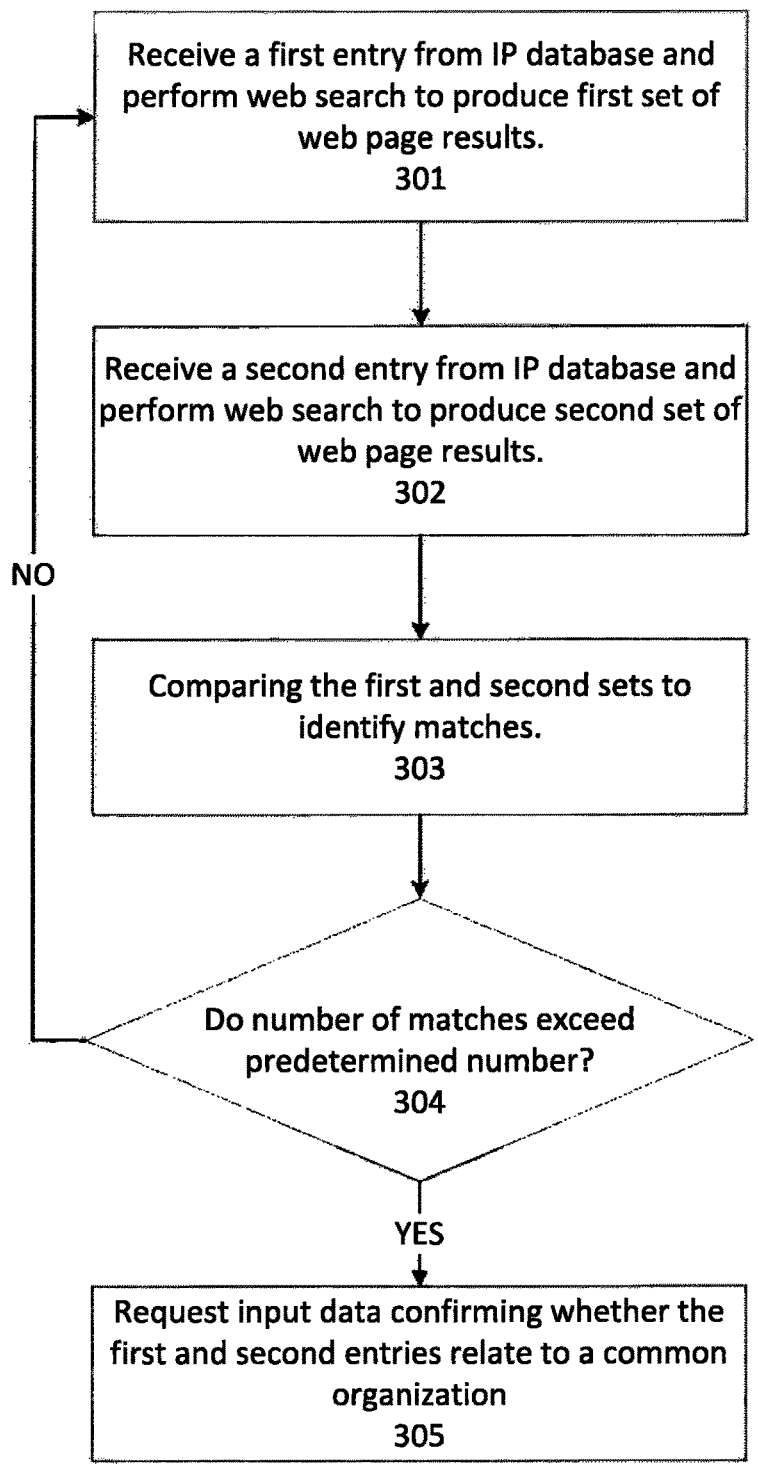
FIG. 4: shows a process for determining candidate organizations for comparison.

FIG. 4 shows in more detail an example of a process that may be implemented by the computer system of FIG. 1 for determining whether or not two organizations are candidates to be related entities, as shown at step C of FIG. 2. Initially, at step 301, a first entry is requested from the IP database 107, the first entry being indicative of the name of an organization associated with a number of patents in the IP database. A web search is then performed to produce a first set of web page results, an example of which is shown for "GlaxoSmithKline" in FIG. 3. At step 302 a second entry, different to the first, is requested from the IP database 107, the second entry also being indicative of the name of an organization associated with a number of patents in the IP database. A web or internet search is then performed to produce a second set of web page results, an example of which is shown for "Glaxo Wellcome Inc." in FIG. 3. The web searches may be limited to a predetermined number of results, and optionally a relatively small number of results, such as 10 or 20 results.

The results of the web based searches are then compared, at step 303, to identify whether any matching or similar web pages and/or web sites were found in both searches. In order for the two organizations to be considered to be candidate organizations that are potentially linked to one another there must be at least one match between the result sets. Optionally a check, 304, may be performed to determine whether the number of matches exceed a predetermined number, such as from 1 to 5 matches. If the number of matches does not exceed the predetermined number then the process reverts back to step 301 to compare a different pair of organizations. The system may also record data indicating that the two organizations compared are not related and that a comparison should not be performed again, or should not be performed again until a predetermined period of time has lapsed such as several months or years. If the number of matches does exceed the predetermined number then the process proceeds to step 305 where the system makes a request for input data from an operator or external entity for data indicating whether the first and second candidate organizations are indeed part of a common organization or are otherwise linked. The request may include the additional information regarding the organizations as discussed in relation to FIG. 2.

As searches and comparisons are performed, such as in the example of FIG. 4, a record is maintained of the number of times a given URL, or domain, results in a match. A record is also maintained of the number of times that a subsequent request for input data, such as request 305 in FIG. 4, results in a positive indication of a link between the two organizations and in a negative indication of a link. A record may also be kept of the number of times the requested data indicates that a determination cannot be made. These records are used to determine whether a given URL or domain is providing good or poor indications of whether organizations are linked, and whether they should be used in future comparisons or not.

Figure 5:
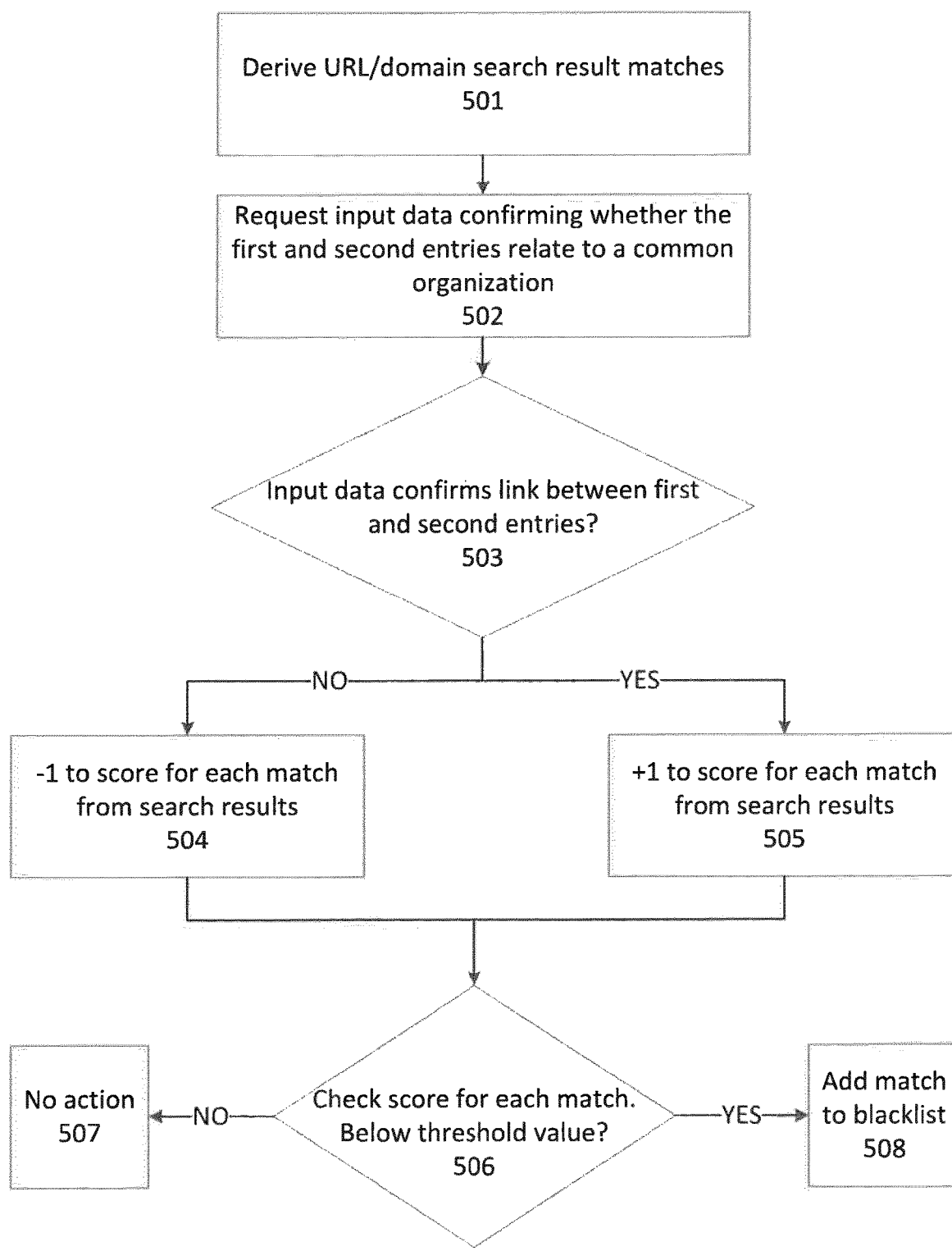
FIG. 5: shows a process for tracking and excluding web search results from further consideration.

FIG. 5 shows in more detail an example of a process that may be implemented by the computer system of FIG. 1 for determining whether or not a given web page, website or domain name should be included on a black list of pages/domains that should not be used in future comparisons to determine whether a first and second organization are linked.

At step 501 the search result matches are derived as described above, the result of which may be a set of matching URLs between the first entry and the second entry. FIG. 3 gives an example with three matches: "gsk.com/uk", "gsk.com/" and "en.wikipedia.org/wiki/glaxosmithkline". As described above a request is then made, 502, for input data confirming whether the first and second entries relate to a common organization. In the example of FIG. 3, the request would ask for confirmation that organizations identified by the entries GlaxoSmithKline and Glaxo Wellcome Inc. are related. A determination 503 is then made as to whether the resulting input data indicates whether the two organizations are linked, the results of which are recorded and associated with each of the URLs determined to be a match.

The system records data indicative of the number of positive indicators relative to the number of negative indicators. A score or value may be associated with each matching URL indicating how many times a match for that URL has contributed to a positive indication or a match, and how many times it has contributed to a negative indication of a match. A record may be kept of all positive and negative indications or, as in the example of FIG. 5, a count may simply be increased when a positive indication has been detected and decreased when a negative indication has been detected. Indications that a link cannot be determined with the available information (e.g. response indicates "don't know") can be recorded also, and may be factored in for example by maintaining a count at its present level.

When the number of negative indicators relative to the number of positive indicators reaches a predetermined threshold, the system is configured to add the URL in question to the blacklist such that the URL is no longer used when comparing search results. The URL may simply be discarded from the search results and the next highest ranking result in terms of relevancy used in its place, for example. In the example of FIG. 5 a check 506 is performed to determine whether the score for each match is below a threshold value. If the threshold has not been breached then the URL can continue to be used in comparisons. If the threshold has been breached then the URL is added to the blacklist and omitted from future use.

Whilst the example above relies upon monitoring and recording data for specific URL matches, the monitoring may be performed for only a portion of the URL such as a URL prefix, or one or more domain name levels forming the URL. For example, a complete URL "http://example.com/one/two/threefourfive . . . " may be monitored, or the prefix "http://example.com/one/two" may be monitored, such that every URL falling within the prefix and identified in the searches may contribute to whether or not the prefix is blacklisted or not. For example, if URLs starting with the prefix "http://example.com/one/two" are found to produce a number of false positives then URLs starting with that prefix will be blacklisted.

Similarly, domains may be monitored in addition to, or instead of, URL or URL portions. For example, the second or third level domain for a given URL may be monitored, with or without the top level domain. In the example above, the URL "http://example.com/one/two/threefourfive . . . " may contribute to the data indicating whether the domain "example.com" is to be blacklisted, preventing the use of any web pages falling within that domain from being used in future comparisons. In this sense, blacklisting for domains can be considered binary, i.e. blacklist all of example.co.uk, or none of it. Separate blacklists may be used for one or more of URLs, URL prefixes, and for domains, and there may optionally be different thresholds associated with any of these categories of URL portion. The blacklists may be held as a list in any appropriate store accessible by the processing unit.

A second aspect of the invention disclosed herein is a computer system operating processes to group or cluster a portfolio of intellectual property rights into different groups or clusters of common technology sectors. This is broadly achieved by deriving, for each right or for each family of rights in a portfolio of rights, a pairwise similarity measure and determining, based on these relative similarities, a plurality of sub-groups of closely related intellectual property rights. These clusters may then be designated with an appropriate label by techniques described herein. Since the clusters are determined by analysis of the similarities between rights within a given portfolio, the clusters can be considered to be derived relative to the portfolio.

A portfolio of intellectual property rights, for the purposes of the second aspect, is a group or subset of intellectual property rights from the IP database 107 of FIG. 1. The portfolio may be identified based upon inputting one or more names of IP owning organizations or entities, which may include, for each organization or entity, those rights belonging to related organizations identified according to the methods described in relation to the first aspect. The portfolio may alternatively be identified by inputting a list of rights, identified by appropriate bibliographic data such as application number, publication number, patent number and so forth, or by any other suitable manner.

The processes of the second aspect are performed by a computer system comprising processors, memory and executable code such as the computer system of FIG. 1. Alternatively, a server system or separate computer system to that of FIG. 1 may be used.

Figure 6A:
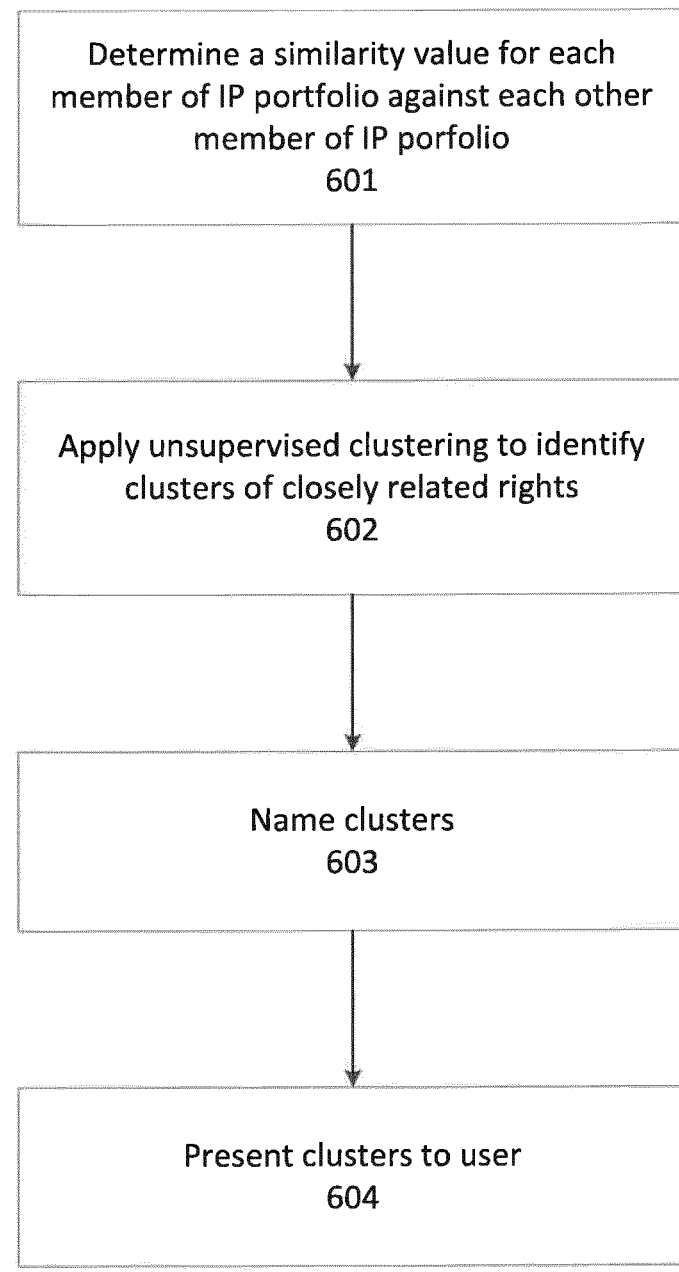
FIG. 6A: is a flow diagram showing the main operational steps of a system according to a second aspect of the invention.

FIG. 6A describes the overall process of the second aspect of the invention. Initially, a portfolio of IP rights is provided and the system then calculates, 601, a similarity value for each right, or family of rights, within the portfolio against each other right, or family of rights, of the IP portfolio. This provides a pairwise similarity measure for all pair combinations within the portfolio. Of course, it will be appreciated that in some embodiments this can be performed for substantially all rights, or families of rights, within the portfolio and still provide useful results. For the avoidance of doubt, a family of rights comprises all intellectual property rights derived from one or more common earlier rights, such as patents or applications sharing one or more common priority applications.

The similarity value can be determined using a number of different methodologies implemented by the system. Example methodologies include a citation based method, a measurement of textual similarity, the use of pre-prepared classifications obtained from the IP database 107 and a value derived from the number of keywords common to the two patents being compared. Any two or more of these methodologies may be used in combination, with appropriate weightings assigned to the values generated from each technique to produce a final numerical value for the similarity of two rights.

Figure 7:
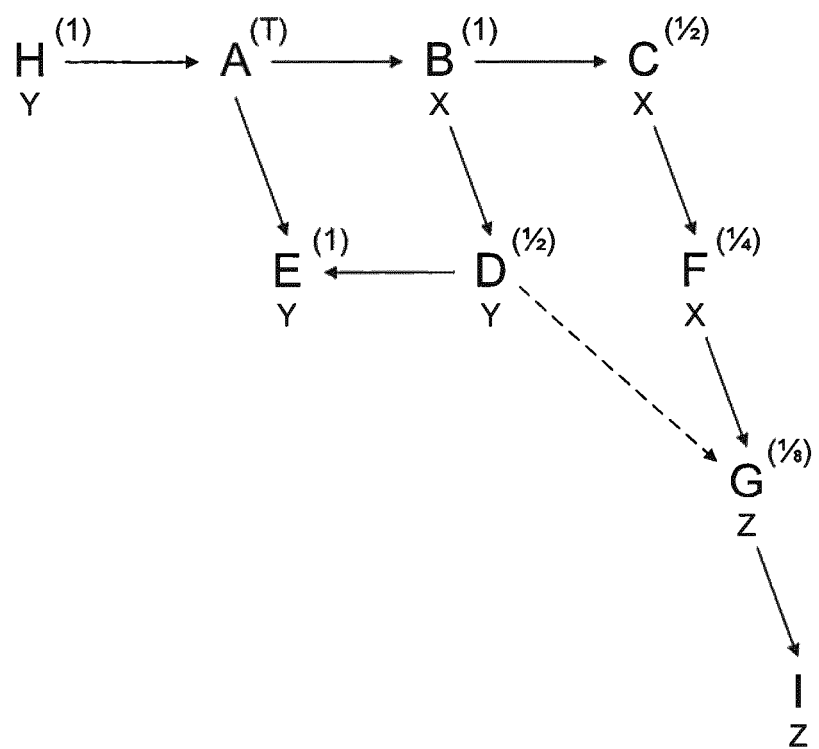
FIG. 7: shows a patent citation graph example.

The citation based method relies upon the use of citations of, or against, the IP right in question. Data indicating citations of a given right against another right, or of other rights against a given right, may be stored within IP database 107. Citations may be applied to patents, for example, and indicate other patents that have been cited against the target patent, or against which the target patent has been cited, during examination by an intellectual property authority such as a patent office. An example of a citation graph, or "tree", is shown in FIG. 7 which shows arrows originating from a particular patent and terminating at another patent. The tail of the arrow indicates the patent being cited, and the head of the arrow indicates the patent against which it is being cited. Forward citations indicate the patent in question has been cited against another patent, whereas backward citations indicate that a patent has been cited against the patent in question. As an example, patent B and E of FIG. 7 are forward citations of patent A, whereas patent H is a backward citation of patent A. Citations may also include indirect citations separated by two or more degrees of separation on a citation graph, for example patents C and D may still be considered citations of patent A, separated by two degrees of separation. Citations may be applied for a single patent or for the entire family of that patent. All these types of citations are an indication of similarity of content between two patents.

The citation graph is analysed by the computer system to determine how close together, on the citation graph, a first right within the portfolio is to another right within the portfolio. A variety of techniques may be used to determine an appropriate value. In particular, a graph distance metric may be applied to the citation data for a given right, such as a spreading activation function. The graph distance metric calculates a value indicative of the separation between the two rights in question as nodes on a graph of citations. The similarity value can be based upon the separation between the patent in question and the patent with which it is being compared on the graph of citations. Alternatively, or in addition, the similarity value can be based upon the occurrence of citations common to both the patent in question and the patent with which it is being compared, with weightings optionally being applied based upon the separation of the common citations from the patent in question. For example, citations beyond a certain predetermined distance metric from the patent in question may not be considered as indicative of similarity and therefore would not contribute to the similarity value.

The measurement of textual similarity between two IP rights, such as patents, may be performed using appropriate automatic analysis techniques. For example, the system may use "n-grams" to analyze all or a portion of the text related to an IP right, such as one or more of the description, claims, title and abstract of a patent. An n-gram is a contiguous sequence of n items from a given sequence of text, applied in this instance at the word level. In order to determine a level of textual similarity, the variable "n" within the n-gram can be set to an appropriate value, such as 2, 3 or 4, to identify recurrences of phrases of 2, 3 or 4 words within a portfolio. Techniques known to the person skilled in the art can then be used to determine a value indicative of the relevance of a given n-gram to the content of the patent in question and the patent with which it is being compared in order to derive a numerical value indicative of the similarity between the two.

One example of an appropriate technique is term frequency-inverse document frequency (tf-idf). The tf-idf weight provides a statistical measure for evaluating how important a word or phrase is in a document or collection of documents. The tf-idf weight may be made up of two terms, the normalized term frequency and the inverse document frequency. The normalized term frequency is the number of times a word or collection of words appears in a document divided by the total number of words in that document. The inverse document frequency is the logarithm of the number of the documents in the collection divided by the number of documents where the specific term appears. Modifications may be made to the general tf-idf to provide improved results.

Pre-prepared classifications may be extracted from the IP right database 107, and may include one or more of International Patent Classification (IPC) codes, Cooperative Patent Classification (CPC) codes, or codes used by any intellectual property office such as the United States Patent and Trade Mark Office. Values can be assigned on the basis of whether two patents are contained within the same code, or are contained within proximate codes having a common root.

Two or more of these methodologies for calculating the similarity value for a given pair of IP rights may be used in combination, with appropriate weightings assigned to the values generated from each technique. The weightings applied to the values derived using each technique are preferably pre-calculated, and may be determined using a genetic algorithm. The weighted values can then be combined to provide, for a given pair of IP rights, a similarity measure. The process can then be repeated for other rights to produce a similarity matrix for the portfolio.

Further processing is then performed on the resulting similarity matrix values to obtain a cluster of related IP rights. For patent rights, the clustering may be used to group patents in the same or similar technical fields. This can be achieved, for example, by applying an unsupervised learning clustering algorithm to the similarity matrix values as indicated at step 602 of FIG. 6A. Such unsupervised learning clustering (or unsupervised clustering) techniques can be used to cluster together similar items based upon numerical similarity values as calculated according to the above techniques. Unsupervised clustering is a technique for finding similar groups within a data set by grouping data that are similar, or near, to each other in one cluster and data that are different, or far, from each other into different clusters. The unsupervised element indicates that no class values are provided to indicate a known grouping of the data. Common practice when selecting the appropriate unsupervised clustering algorithm is to run several algorithms using different distance functions and parameter settings, and analyze and compare the results to identify the best algorithm.

Having produced the clusters of related IP rights from the original portfolio the next step, at 603, is to label the clusters in a way that is meaningful for the users of the system. The technique described below is described in conjunction with steps 601 and 602, but may also be used on any cluster of IP rights, particularly patents, however those clusters are generated. The labelling of the clusters may therefore form an independent aspect of the invention.

Figure 6B:
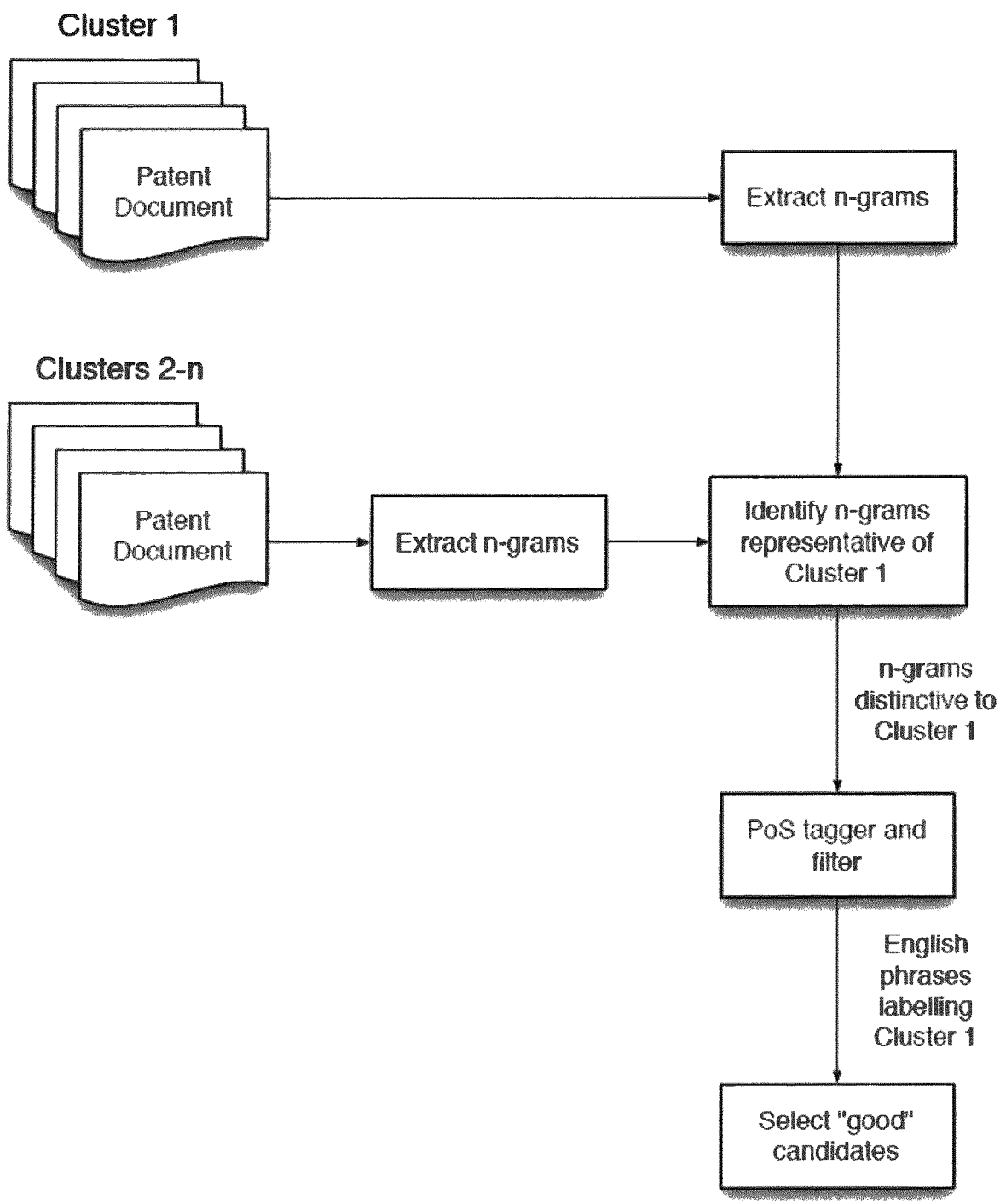
FIG. 6B: is a flow diagram showing an example of how clusters may be labelled.

FIG. 6B shows an example of how clusters may be labelled. To label the clusters, repeating phrases between patents in a given cluster are found by analysing all, or at least a portion, of the patents within the cluster. The portions of the patents that are analysed may include one or more of the description, abstract, title and claims. The repeating phrases may be identified using any suitable technique. One technique is to extract and use n-grams, as discussed above. The n-gram technique can be used to apply scores to recurring n-grams indicative of their importance to the portfolio cluster. The score may, for example, be the frequency of each n-gram. The n-gram scoring technique can be further enhanced by weighting towards n-gram phrases that are common or recurring within the patents of the cluster in question and unique to that cluster. The technique may alternatively, or additionally, be enhanced by weighting away from n-gram phrases that also occur in other clusters. These weightings may be determined based upon experimentation, and may be based upon the number of occurrences of a particular phrase in either the cluster in question or in the other clusters. In the extreme, phrases that are common or recurring only within the patents in the cluster in question may be considered for potential labels, and phrases that are common or recurring also in the patents in other clusters may be disregarded.

Once candidate phrases are identified a text recognition or grammatical tagging algorithm, such as a part of speech (POS) tagger, is used to identify appropriate phrases for labelling a given cluster. The POS tagger allows common phrases that do not make linguistic sense, or phrases that would not provide a good description of a group based on an analysis of linguistic terms, to be excluded from consideration. POS tagging algorithms determine whether a given phrase or n-gram in a document corresponds to a particular part of speech, or particular word category, and tags the word accordingly. This allows, for example, words within a text, or within an n-gram, to be tagged with their grammatical categories such as one or more of verbs, nouns, pronouns, adjectives, adverbs, prepositions, conjunctions, and interjections. The tagging may be based on the definition of a term as well as its context, including relationships with adjacent and related words in a phrase, sentence, or paragraph.

The POS tagger may look for n-grams that feature particular combinations of words of particular grammatical categories, determining whether each of the n-grams adheres to a predetermined pattern of terms having specified grammatical categories and filtering the n-grams from further consideration based on the determination. For example, the POS tagger may identify n-grams that conform to common structures, such as noun-phrase or verb-phrase patterns, and filter out any n-grams that do not conform to such patterns. As an example, where n=3, the POS tagger may identify n-grams that feature a combination verb/noun/verb, or adjective/verb/noun, and filter out other n-grams from further consideration. The POS tagger can also be used to exclude n-grams that do not make linguistic sense.

A third aspect of the invention disclosed herein is a computer system operating processes to present information related to a portfolio, set or cluster of intellectual property rights to a user. In particular this is achieved by comparing a given portfolio of intellectual property rights with one or more similar portfolios, the similarity being identified according to the techniques described herein, and then plotting the results on a graphical display indicative of relative parameters between the two or more portfolios.

The processes of the third aspect are performed by a computer system comprising processors, memory and executable code such as the computer system of FIG. 1. Alternatively, a server system or separate computer system to that of FIG. 1 may be used.

Figure 8:
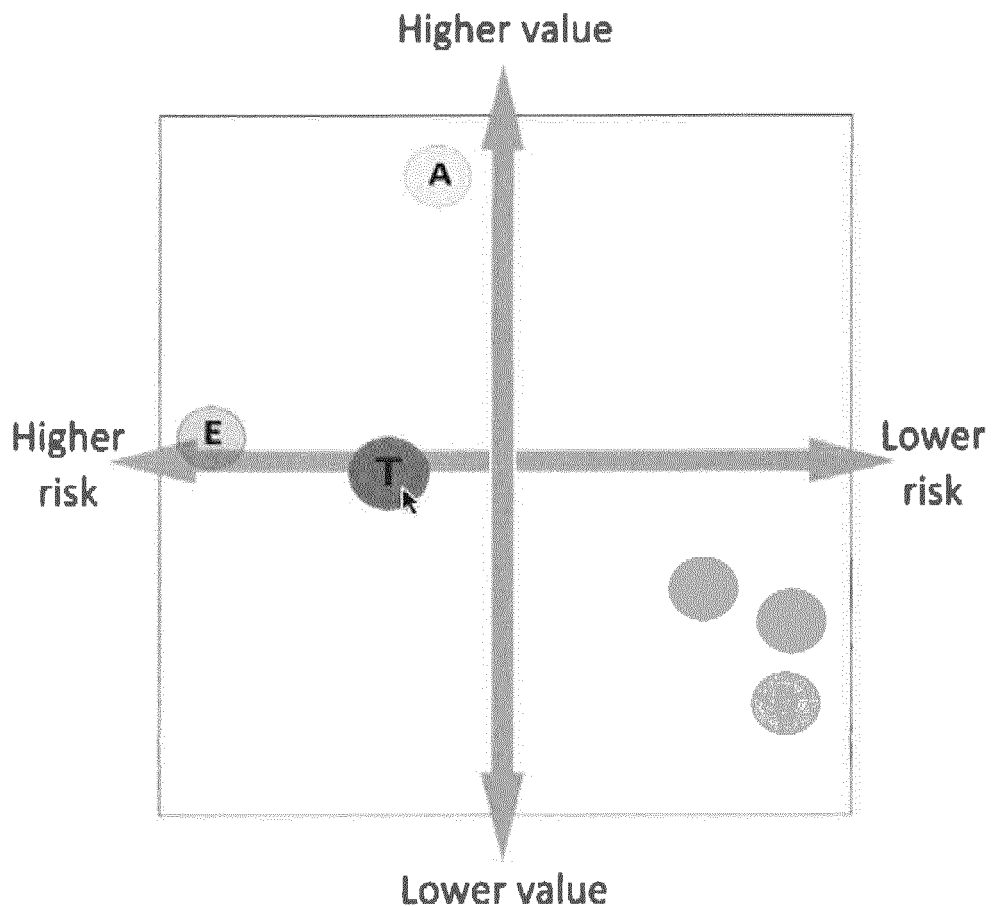
FIG. 8: shows an example display for presenting information to a user indicative of a value associated with an organization's patent portfolio, and a risk of legal action associated with the organization.

FIG. 8 shows an example of a plot in which the portfolio of a target company T has been plotted on a grid relative to the portfolio of a set of comparison companies A-E. The grid indicates the relative risk factor of an intellectual property legal action being made against company T in a given period of time plotted against the relative monetary value of the portfolio of the target company T, as compared with companies A-E. In order to determine the positions of the portfolios on the plot a determination is made of the most comparable companies or entities with which to compare the target company T's portfolio. A calculation is then made of the relative risk and value figures.

Whilst an example will be described in relation to the entire portfolio of an organization, this grid plotting can be performed for a particular cluster of a portfolio, or any predetermined subset of intellectual property rights. The grid plotting aspect can be used in conjunction with any of the other aspects of the invention described herein, using the outputs of those aspects to generate the grid.

To determine the organizations with which to compare the target company T, use is made of a citation based method that shares certain similarities with the citation based method described in relation to the second aspect of the invention. Again, the citation based method relies upon the use of citations of, or against, the IP rights contained within the portfolio of the target company T, using data indicating citations of a given right against another right, or of other rights against a given right, stored within an IP database such as database 107 of FIG. 1.

An example will be described in relation to patent rights. For each, or substantially each, patent in a portfolio a determination is made as to the citations proximate to the patent in question. The owners of these citation patents are used to determine the portfolios with which the portfolio of the target company T is compared. Referring back to the example of FIG. 7, a given patent may have forward and backward citations connected to the patent by one or more degrees of separation. Data can be extracted from the database 107 indicating the organization or entity that owns each of the patent citations connected to the patent in question. The sum of citation patents belonging to each organization is calculated to assign a score to each of the organizations, this being repeated for each patent in the portfolio in question to calculate an overall score for each organization, and a predetermined number of highest scoring organizations are selected, such as the highest scoring organization, the top three or top five organizations.

Optionally, only patents within a predetermined number of degrees of separation from the patent in question are considered, and patents outside of the predetermined number of degrees of separation are discounted. For a target patent A, referring again to FIG. 7, the number of degrees of separation considered may be four degrees, such that patents B, C, D, E, F, G and H are taken into consideration but patent I is discounted. For illustration purposes only, were the dotted arrow of FIG. 7 to be included as a citation of D against G then patent I would become a fourth degree citation and so would no longer be discounted.

The weighting given to a particular citation may be varied depending upon a number of factors. One factor that may be considered is the number of degrees of separation from the target patent. The citation graph may be analysed by the computer system to determine how close together, on the citation graph, a first right within the portfolio is to another right within the portfolio. As above, a variety of techniques may be used to determine an appropriate value such as a graph distance metric applied to the citation data for a given right. Referring to the example of FIG. 7, the weighting associated with any particular patent may decrease as the number of degrees of separation from the target patent increases. In the example of FIG. 7, the weighting applied to each patent halves with each degree of separation away from the target patent. As can be seen a rating of 1 is applied to patents B and E, which are a single degree of separation from the target patent A. This becomes 0.5 at two degrees of separation, 0.25 at three degrees and 0.125 at four degrees. If patents B, C and F belonged to company X, patents E, H, D belonged to company Y and patents G and I belonged to company Z then company X would have a score of 1.75, company Y would have a score of 2.5 and company Z would have a score of 0.125. As mentioned above, this process is repeated for each patent in the portfolio of the target company T and a total score for each organization owning appropriate citation patents is calculated to determine the most relevant organizations with which to compare the target company.

Whilst it is possible to calculate the parameters above on the fly, or in real time, to determine the organizations with which to compare the target company T, in some embodiments at least some of the calculations can be performed in advance and the results stored in a memory of, or accessible by, the computer system for future use. For example, a pre-calculation could be made to determine, for each patent in the database 107, the scores for organizations having patents within a predetermined number of degrees of separation of the target patent.

A value indicative of litigation risk can then be calculated for the target company based on information obtained from database 107 or another source or database. The litigation risk may be a value derived from a number of factors. These factors include one or more of: the number of pending and historical legal actions against the target organization and the size of portfolio of the target organization. The risk value increases with the number of pending legal actions and historical legal actions lost by the target organization, whereas the risk value decreases with the number of historical legal actions won by the target organization. Similarly, the size of the portfolio of the target organization decreases the risk value in proportion to the number of patents or patent families in the portfolio, such that a larger portfolio reduces the risk value. Corresponding risk values are also derived for the comparison organizations in the same manner, as a function of the above mentioned factors.

A value indicative of the monetary value of the target company is similarly derived based upon data extracted from database 107 or other source or database. The monetary value may be derived based upon a number of factors including one or more of: licensing information, historical sale information relating to patents, and whether any patents in the target portfolio are essential to one or more standards.

A plot is then created, or the sort shown in FIG. 8, that indicates the risk and value of the portfolio of the target company as compared with the equivalent risk and value of portfolios of the organizations calculated to be most similar to the target company.

A fourth aspect of the invention disclosed herein is a computer system operating processes to present information related to a portfolio, set or cluster of intellectual property rights to a user. In particular this is achieved by comparing given clusters of a first portfolio of intellectual property rights with equivalent clusters in one or more similar portfolios, the similarity being identified according to the techniques described herein, and then plotting the results on a graphical display indicative of relative parameters for clusters between the two or more portfolios, and particularly indicative of the number of families within a particular cluster for each portfolio.

The processes of the fourth aspect are performed by a computer system comprising processors, memory and executable code such as the computer system of FIG. 1. Alternatively, a server system or separate computer system to that of FIG. 1 may be used.

A portfolio of a target entity T is identified, which contains a number of families of intellectual property rights. The portfolio is then processed to group or cluster the portfolio into different groups or clusters of common technology sectors. This clustering may be done according to the second aspect of the invention described herein.

One or more similar entities, $C_n$, to target company T, each having their own portfolio of rights, is identified. This may be performed in accordance with the method of the third aspect of the invention.

For each family of intellectual property rights contained within each of the portfolios of the similar entities $C_n$ a pairwise comparison is performed with each family of intellectual property rights within the target entity T's portfolio. The comparison identifies, for each right within the portfolio of entity $C_n$, the most similar right within the portfolio of entity T. This similarity determination may be performed on the same basis as that described in relation to the second aspect of the invention. That is, similarity values can be determined using one or more of the citation based method, measurement of textual similarity, use of pre-prepared classifications, and a value derived from the number of keywords common to the two rights being compared.

For a given right $R_{cn}$ in portfolio $C_n$ it is determined which right $R_T$ within portfolio T has the highest similarity value.

The right $R_{cn}$ from portfolio $C_n$ is then categorised into a cluster equivalent to the cluster determined for right $R_T$ from portfolio T. This allows equivalent clusters within portfolios T and $C_n$ to be compared.

The pairwise comparison between rights in portfolios $C_n$ and T may be pre-calculated and stored in a global look-up table that stores pairwise comparisons between all rights stored on the database 107, regardless of the entity to which they belong. Alternatively, the pairwise comparisons may be calculated in any other suitable manner, including on the fly at the time of receiving a request to compare the portfolios.

If none of the similarity values between a given right in portfolio $C_n$ and the plurality of rights in portfolio T exceed a predetermined threshold value that right may be classified in a separate grouping or cluster different to any of the groupings or clusters identified for portfolio T. For example, a cluster marked as "other" may be used. This ensures that the clusters of $C_n$ truly contain rights that are similar to the rights in the clusters of T. The predetermined threshold value for the similarity value will depend on the similarity metric(s) used, and may be determined based upon experience or various machine learning algorithms.

Figure 9:
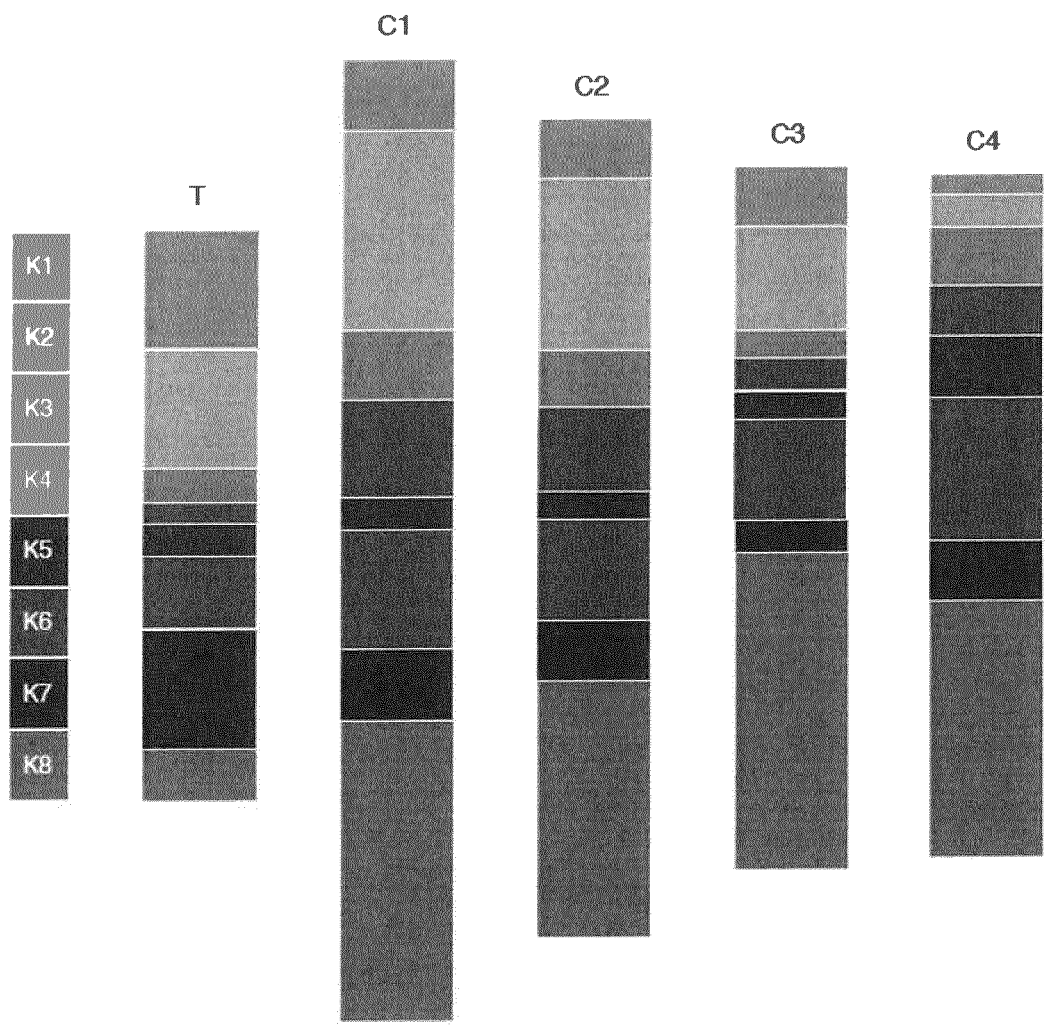
FIG. 9: shows an example display for presenting information to a user indicative of the number of rights contained within different technology clusters associated with a plurality of organizations' patent portfolios.

FIG. 9 shows an example of how the results of the fourth aspect of the invention may be compared. A portfolio of a target entity T has been identified and divided into clusters K1-K8 as described above. A number of similar entities C1-C4 have been identified, also as described above. Each of the portfolios of the similar entities have been divided into clusters equivalent to the clusters K1-K8 as described above. Any rights within each of the portfolios C1-C4 that do not have a similarity value above the threshold value for any of the rights in portfolio T are classified in the "other" group.

For each cluster in each portfolio, the number of rights contained therein is determined, and may then be displayed on a display. The graph of FIG. 9 shows, for each cluster in each portfolio, the proportion of rights contained. This allows an easy identification of the relative number of rights within each portfolio, and the relative number of rights within each cluster across the portfolio. As can be seen in FIG. 9, the same labelling determined for each of the clusters of portfolio T can be used for the equivalent clusters of the other similar portfolios C1-C4.

Aspects of the present invention may be embodied as a method, a data processing system, or a computer program product. Accordingly, aspects of the present invention may take the form of an entirely hardware embodiment, an entirely software embodiment or an embodiment combining software and hardware aspects. Furthermore, aspects of the present invention may take the form of a computer program product on a computer-readable storage medium having computer-readable program code means embodied in the storage medium.

The aspects of the invention have been described with reference to block diagrams and flowchart illustrations of methods, apparatus (i.e., systems) and computer program products. It will be understood that blocks of the block diagrams and the flowchart illustrations, and combinations of blocks in the block diagrams and combinations of the blocks in the flowchart illustrations, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the block or blocks.

The invention claimed is:

1. A computerized method of comparing a given set of intellectual property rights with one or more similar collections and outputting data indicative of the comparison for presentation to a user, the method comprising:
    receiving data identifying a first set of intellectual property rights;
    determining one or more similar sets of intellectual property rights;
    deriving first and second parameters for each of the similar sets of intellectual property rights; and
    outputting data for display indicative of the parameters for each of the similar sets of intellectual property rights;
    wherein the step of determining one or more similar sets of intellectual property rights comprises:
    receiving from a database, for a first plurality of intellectual property rights within the first set, citation data indicative of citations related to each of the intellectual property rights in the first plurality of intellectual property rights;
    for each of the intellectual property rights in the first plurality of intellectual property rights, requesting from a database, for a subset of the citations, data identifying an organization associated with each of the citations within the subset;
    assigning a ranking value to each organization based upon the number of citations within the subset associated with each organization; and
    selecting one or more sets of intellectual property rights based on rankings of each organization.

2. A computer system comprising one or more processors, one or more memories and one or more programs stored in one or more of the memories for execution by one or more of the processors, the system being programmed to carry out the method of claim 1.

3. A computer system according to claim 2 wherein the subset of citations is determined by determining, using a graph distance metric, a value indicative of separation between the intellectual property rights and the citations correspondingly related to the intellectual property rights from a citation tree for the intellectual property rights.

4. A computer system according to claim 3 wherein the subset of citations consists of each of the citations within a predetermined number of degrees of separation from the intellectual property rights.

5. A computer system according to claim 2 wherein the ranking value for a given organization is determined by summing a value for each of the citations within the subset associated with the organization and weighting the value dependent upon a value indicative of the separation between each of the intellectual property rights and the citations on a citation tree for the intellectual property rights.

6. A computer system according to claim 2 wherein the selecting of one or more sets of intellectual property rights based on the ranking value of the organizations comprises requesting, from a database, intellectual property right portfolios for a predetermined number of top ranked of the organizations.

7. A non-transitory computer readable storage medium comprising program code which, when executed on one or more processors, carries out the method of claim 1.

* * * * *